United States Patent
Jackson et al.

(10) Patent No.: US 7,133,993 B1
(45) Date of Patent: Nov. 7, 2006

(54) INFERRING SIZE OF A PROCESSOR MEMORY ADDRESS BASED ON POINTER USAGE

(75) Inventors: Robert Jackson, Headington (GB); Jonah Graham, High Wycombe (GB)

(73) Assignee: Altera Corporation, San Jose, CA (US)

( * ) Notice: Subject to any disclaimer, the term of this patent is extended or adjusted under 35 U.S.C. 154(b) by 259 days.

(21) Appl. No.: 10/753,051

(22) Filed: Jan. 6, 2004

(51) Int. Cl.
*G06F 12/00* (2006.01)
*G06F 9/45* (2006.01)

(52) U.S. Cl. .................. 711/172; 711/170; 711/171; 717/151

(58) Field of Classification Search .................. None
See application file for complete search history.

(56) References Cited

U.S. PATENT DOCUMENTS

| | | | | |
|---|---|---|---|---|
| 5,809,306 | A * | 9/1998 | Suzuki et al. ............... | 717/143 |
| 6,049,667 | A * | 4/2000 | Bates ......................... | 717/138 |
| 6,154,823 | A * | 11/2000 | Benayon et al. ............ | 711/171 |
| 6,202,202 | B1 * | 3/2001 | Steensgaard ................ | 717/127 |
| 6,658,652 | B1 * | 12/2003 | Alexander et al. .......... | 717/128 |
| 6,785,888 | B1 * | 8/2004 | McKenney et al. ......... | 718/104 |
| 6,931,507 | B1 * | 8/2005 | Kim et al. ................... | 711/170 |
| 6,952,760 | B1 * | 10/2005 | Boucher et al. ............ | 711/170 |
| 6,961,807 | B1 * | 11/2005 | Hauck ........................ | 711/103 |
| 6,964,049 | B1 * | 11/2005 | Iglesias et al. ............. | 718/107 |

OTHER PUBLICATIONS

Microsoft Computer Dictionary, 2002, Microsoft Corporation, Fifth Edition, pp. 116, 313, and 467.*
GCC 3.3 Release Series, http://gcc.gnu.org/gcc-3.3, printed Mar. 12, 2005, 2 pages.
GCC 3.3 Release Series Changes, New Features, and Fixes, http://gcc.gnu.org/gcc-3.3/changes.html, printed Mar. 12, 2005, 23 pages.

* cited by examiner

*Primary Examiner*—Reginald Bragdon
*Assistant Examiner*—Shawn Gu
(74) *Attorney, Agent, or Firm*—Beyer Weaver & Thomas, LLP

(57) ABSTRACT

Methods and apparatus are provided for accessing the proper memory in processors having program and data memories with different sizes. In some embodiments, a processor is optimized for data access and has registers that are the same size as the data memories. When a program is compiled, some implementations identify when a pointer variable points to a piece of data (data memory) or a function (program memory) and synthesize different sized operations accordingly. The proper mode and size are assigned for each pointer. Methods of the present invention do not require annotation of functions. Existing code does not need to be modified and there is no opportunity to introduce errors. The invention does not require extra program memory to be located at directly accessible locations to store stub code.

16 Claims, 4 Drawing Sheets

INFERRING SIZE OF A PROCESSOR MEMORY ADDRESS BASED ON POINTER USAGE

BACKGROUND OF THE INVENTION

1. Field of the Invention

The present invention relates to processors. More specifically, the present invention relates to methods and apparatus for accessing a memory on a processor.

2. Description of Related Art

Processors often store data and functions in different memories or in different parts of the same memory. The sizes of these memories may be different. In conventional processors, program and data memories are often implemented on a single device. However, in DSP processors, program and data memories are frequently implemented on separate devices with separate buses. Data memory is typically much faster and program memory is sometimes read only.

When parsing the source code written for such processors, a compiler must be able to recognize whether a pointer should be stored as a small or a large value ("near" or "far"). The compiler then generates the appropriate object code.

If the pointer variables used to store memory addresses cannot address the whole memory space, a programmer may decide to place a function in the directly addressable part of the memory space. This could be achieved, for example, by annotating the functions (or pointers to the functions) e.g., with explicit near/far declarations. This method requires extra programmer effort, both in initially labeling pointers and in re-labeling them if a function is relocated. Moreover, there is a danger that the programmer may fail to label a function correctly. For example, a "near" pointer may in fact end up requiring a large storage location.

Other systems have used the linker to detect all instances when the address of a program memory object is taken and to ensure that the object is stored as a small value so it can be handled by the code that is generated for data objects. Sometimes the linker inserts extra code so that only a stub of the program object is stored as a small value (i.e. a JUMP to the real memory location). This method consumes extra space and requires that at least some program memory be directly addressed.

It is therefore desirable to provide improved methods and apparatus for improving memory access efficiency.

SUMMARY OF THE INVENTION

Methods and apparatus are provided for accessing the proper memory in processors having program and data memories with different sizes. In some embodiments, a processor is optimized for data access and has registers that are the same size as the data memories. When a program is compiled, some implementations identify when a pointer variable points to a piece of data (data memory) or a function (program memory) and synthesize different sized operations accordingly. The proper mode and size are assigned for each pointer.

This invention allows compilers to be written for processors having segmented address spaces and complex address maps. The invention is useful in a variety of contexts, such as for soft processors on programmable chips, which have more constraints on their memory and address decoding than traditional hard processors. Methods of the present invention do not require annotation of functions. Existing code does not need to be modified and there is no opportunity to introduce errors. The invention does not require extra program memory to be located at directly accessible locations to store stub code.

Some implementations of the invention provide a method of accessing memories in a processor. The method includes the following steps: identifying whether a pointer variable points to a data memory having a first size or a program memory having a second size greater than the first size; allocating the first size to the pointer variable when the pointer variable points to the data memory; and allocating the second size to the pointer variable when the pointer variable points to the program memory.

The method may be performed when source code is compiled. The processor may include a plurality of registers having a third size equal to the first size. The method may be performed by a compiler or by preprocessing script.

Some embodiments of the invention provide an apparatus for accessing memories in a processor. The apparatus includes the following elements: a mechanism for identifying whether a pointer variable points to a data memory having a first size or a program memory having a second size greater than the first size; a mechanism for allocating the first size to the pointer variable when the pointer variable points to the data memory; and a mechanism for allocating the second size to the pointer variable when the pointer variable points to the program memory. The processor may include a plurality of registers having a third size equal to the first size.

Other embodiments of the invention provide a computer program stored in a machine-readable medium. The program contains instructions to control a device to perform the following steps: identify whether a pointer variable points to a data memory of a processor, the data memory having a first size or a program memory of the processor, the program memory having a second size greater than the first size; allocate the first size to the pointer variable when the pointer variable points to the data memory; and allocate the second size to the pointer variable when the pointer variable points to the program memory. The instructions may be executed when source code is compiled. The instructions may be executed by a compiler or by preprocessing script. The processor may include a plurality of registers having a third size equal to the first size.

Alternative embodiments of the invention provide a programmable chip, comprising: a processor having a plurality of registers; a data memory accessible by the processor, the data memory having a first bit width; a program memory accessible by the processor, the program memory having a second bit width. Memory is accessed by pointers allocated by the following process: identifying whether a pointer variable points to a data memory having a first size or a program memory having a second size greater than the first size; allocating the first size to the pointer variable when the pointer variable points to the data memory; and allocating the second size to the pointer variable when the pointer variable points to the program memory. The plurality of registers may have a third bit width equal to the first bit width.

These and other features and advantages of the present invention will be presented in more detail in the following specification of the invention and the accompanying figures, which illustrate by way of example the principles of the invention.

BRIEF DESCRIPTION OF THE DRAWINGS

The invention may best be understood by reference to the following description taken in conjunction with the accompanying drawings, which illustrate specific embodiments of the present invention.

DETAILED DESCRIPTION OF SPECIFIC EMBODIMENTS

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. For example, the techniques of the present invention will be described in the context of particular processor cores and hardware acceleration cores.

However, it should be noted that the techniques of the present invention can be applied to a variety of types of devices. In the following description, numerous specific details are set forth in order to provide a thorough understanding of the present invention. The present invention may be practiced without some or all of these specific details. For example, while much of the following description pertains to programmable chips, the present invention applies to both programmable and non-programmable chips. In other instances, well known process operations have not been described in detail in order not to unnecessarily obscure the present invention.

Figure 1:
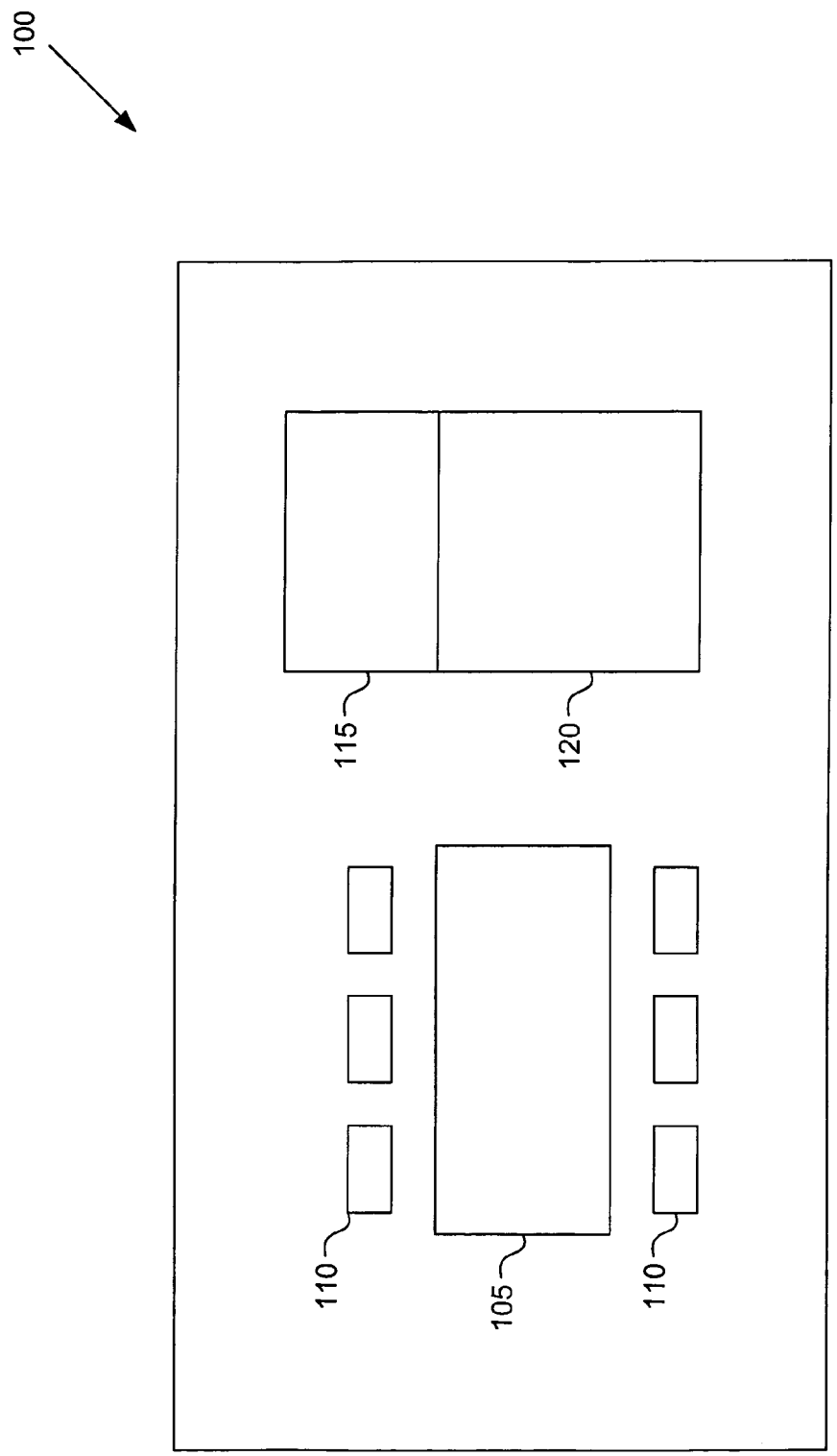
FIG. 1 is a diagrammatic representation showing a system with on-chip memory.

FIG. 1 is a diagrammatic representation showing one example of a system 100 on a programmable chip. System 110 includes processor core 105, a plurality of registers 110, data memory 115 and program memory 120.

Processor core 105 may include any logic or mechanism known by those of skill in the art for supporting an instruction set. In one example, processor core 105 is a Central Processing Unit (CPU) or a DSP core having Arithmetic Logic Units (ALUs) and Multiply Accumulate Blocks (MACs).

Processor core 105 can access information in registers 110 and memories 115 and 120. Having memory on-chip allows relatively fast memory read and write access by processor core 105. The number of registers 110 shown in FIG. 1 is purely illustrative. Registers 100 and memories 115 and 120 may have any appropriate storage capacity. However, keeping the registers and/or data memory smaller requires fewer of the available resources of a processor. Accordingly, relatively small registers and/or data memory are desirable in certain implementations, e.g., for programmable chips. In one embodiment, registers 110 are 16-bit registers, data memory 115 is a memory with $2^{16}$ entries and program memory 120 is a memory with at most $2^{24}$ entries.

It should be noted that system 100 can include both on-chip and off-chip memory. Moreover, a variety of other on-chip and off-chip components may be part of system 100, but these are not directly pertinent to the present invention and therefore are not shown in FIG. 1.

The programmable chip uses different types of resources that can be interchangeably used in different allocations to implement the system on a programmable chip. In one example, the programmable chip uses logic elements for implementing each of the various components on the programmable chip. Logic elements typically can be implemented using components such as antifuses, static RAM, and EPROMS. Any mechanism on a programmable chip that performs an operation on a given number of input lines to provide one or more outputs based on information programmed is herein referred to as a logic element. Some logic elements are implemented as combinations of look up tables and switches for performing Boolean operations on input lines. In one example, a logic element includes a 16-bit SRAM lookup table (LUT) that can implement an arbitrary 4-input logic function, circuitry that forms a fast carry chain and a fast cascade chain, a register and preset/reset logic for the register.

As noted above, there are various methods known in the art for compiling source code for processors having different-sized data and program memories. In preferred implementations of the invention, it is determined when variables point to executable code (i.e., functions or GOTO line labels). Relatively larger amounts of storage are allocated for such variables, as compared to variables that do not point to executable code.

In order to appreciate more fully some of the distinctions between the present invention and the prior art, some examples of prior art techniques are set forth in the following paragraphs. According to one such technique, pointers are annotated to say whether they should be stored as small or large values (near or far). The compiler will then generate the appropriate code. Code for implementing an example of this technique is set forth below:

```
int *pointer_to_long_data_object;           //X01
void (*pointer_to_function_object)(int argument1,    //X02.1
int argument2);
pointer_to_function_object = &function 10;      //X02.2
```

Lines X01, X02.1 and X02.2 indicate two "pointer" program variables, which are variables used to store the address of an object in memory. X01 is a "data pointer": it stores the address of, and hence points to, a data object of type "int" (integer). Lines X02.1 and X02.2 indicate a "function pointer" that stores the address of, and hence points to, a function. The function returns a "void" value and takes two arguments of type "int" called "argument1" and "argument2." Such pointer variables may be stored in a memory location or in registers within the CPU. Typically, a single class of memory location or register is used to store pointers.

```
near void (*pointer_to_function_object)(int argument1,   //X03.1
int argument2);
far void (*pointer_to_function_object)(int argument I,   //X03.2
int argument2);
void function_20(int argument1, int argument2)    //X04
*pointer_to_function_object( 10, 20);     //X05
```

In lines X03.1 and X03.2 of the sample code, pointers are annotated to say whether they should be stored as small or large values (near or far). The compiler will then generate appropriate code. Line X04 is a function declaration and line X05 is an example of calling a function.

A comparison of the labeled declarations in X03.1 and X03.2 with the unlabeled declaration in X02 indicates that this method requires extra programmer effort, both in initially labeling pointers and in re-labeling them if a function is relocated. This method is error prone because a "near" (i.e. small) pointer may in fact end up requiring a large storage location.

An alternative to relocating the entire function is to relocate only part of it. For example, the normal compiler output for a function may be as shown in lines X06, below:

```
        .section NORMAL_PROGRAM_SECTION // X06.1
        .global_symbol_function_10
        .type_function_10, function
_function_10:                              // X06.2
        ;; machine code for function
        ;;
        RETURN
```

The first line X06.1 specifies where the program code should be located in memory. The second line specifies that a named symbol identified as "_function_10" be created in the linker symbol table and be made available to other tools (i.e. a "global symbol"). The third line defines that the named symbol is a function address. The line X06.2 is an assembler label defining the entry point for the function. The following lines up to the RETURN are the body of the function, with the RETURN being the instruction to return from a function.

The function shown in lines X06 can be implemented as a compiler-generated stub, e.g., as shown in lines X07:

```
        .section DIRECTLY_ADDRESSABLE_SECTION // X07.1
        .global_symbol_function_10
           .type_function_10, function
_function_10:                              //X07.2
        SAVE REGISTER R1 R2
        LOAD R1, R2 with ADDRESS OF function10_real
        JUMP TO ADDRESS (R1,R2)
        .section NORMAL_PROGRAM_SECTION
        .global_symbol_function_10_real
        .type_function_10_real, function
_function_10_real:                         //X07.3
        ;; machine code for function
        ;;
        RETURN
```

In lines X07, only a compiler-generated stub that calls the real function is stored in directly addressable memory. This stub may be called a "THUNK Function". This method consumes extra space and requires that some program memory be directly addressable.

If the pointer variables used to store memory addresses cannot address the whole memory space the programmer may decide to place a function in the directly addressable part. This could be achieved by annotating the function, e.g., as shown in X10.1 and X10.2:

```
        void function_20(int argument1, int argument2)    //X 10.1
           _ATTRIBUTE_( STORE_IN_DIRECTLY_
           ADDRESSABLE_SECTION) //
        X10.2
```

The attribute specified in X10.2 is recognized by the compiler and the section tag (e.g., as shown in X06.1) is changed accordingly. Again, there is a danger that the programmer may fail to label a function correctly.

Figure 2:
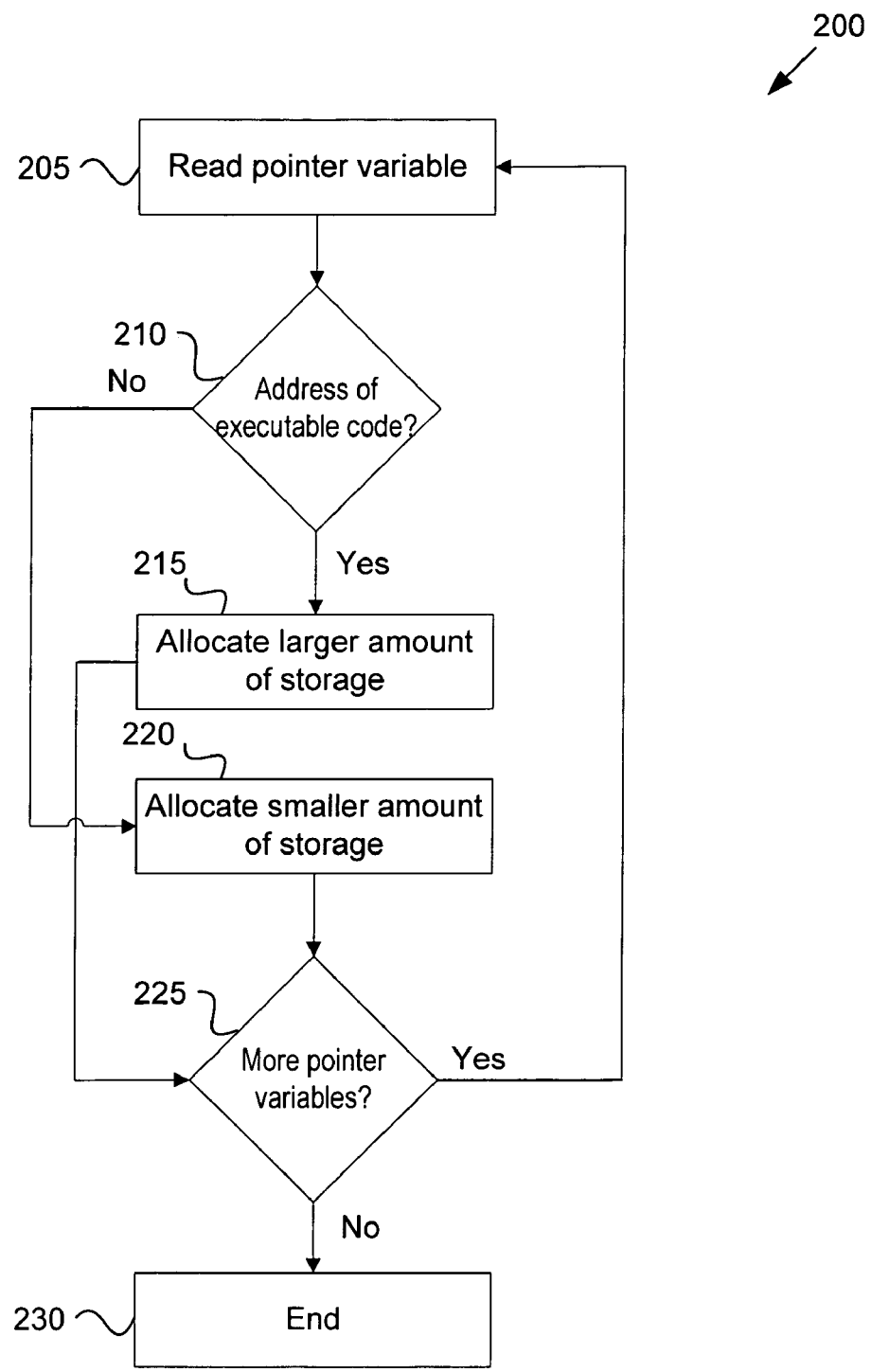
FIG. 2 is a flow chart illustrating a method according to an embodiment of the invention.

FIG. 2 is a flow chart illustrating one method of the present invention for handling different sized pointers. Method 200 may be implemented in various ways. In some implementations, method 200 is integrated into the compiler itself. Alternatively, method 200 may be implemented as preprocessing script.

In step 205, a pointer variable of the source code is read. If the pointer variable points to executable code (step 210), a relatively larger amount of storage is allocated (step 215). If the pointer variable does not point to executable code, a relatively smaller amount of storage is allocated (step 220). In step 225, it is determined whether there are more pointer variables to evaluate. If so, the preceding steps are repeated. If not, the process ends in step 230.

In other words, each pointer is examined to determine what it could point to. If it could only point to something in the data range of memory, then it is only going to occupy the storage size of data memory (e.g., 16 bits). If it might point to something outside the data range, it is an instruction address of some kind. The compiler may determine what the pointer may point to by analyzing the source code and detecting when the pointer is used to store or access a function (X02.2 and X05), detecting when the pointer is used to store the address of a "GOTO line_" label, and by detecting if the pointer was declared to be a pointer to a function (X02.1) or label. Regardless, the instruction would be allocated a relatively larger amount of storage (e.g., 32 bits).

As known by those of skill in the art, a compiler is a program that translates source code into object code. A compiler derives its name from the way it works: it looks at an entire portion of source code, collecting and reorganizing the instructions. Every high-level programming language (except strictly interpretive languages) comes with a compiler. Because compilers translate source code into object code, which is unique for each type of computer, many compilers are available for the same language.

There are normally several phases of the compilation process. The first phase is often called the "lexical analysis" phase, in which a lexical analyzer converts the source code into a set of tokens. A token is usually a number representing some keyword in the language. The compiler has a unique number for each keyword (e.g., "END") and each arithmetic or logical operator (i.e. "+," "−," "OR," etc.). The tokens transform the programming language into a form that can be checked for proper structure and order. Another part of the lexical analysis phase is to build a "symbol table" of all the identifiers (variable names, procedures and constants) used in the source code. When an identifier is first recognized by the lexical analyzer, the identifier is inserted into the symbol table, along with information about its type, where it is to be stored, etc.

The source code is then parsed (syntax analysis). In this phase, parsers determine whether the program is written according to predetermined rules or "grammar" for the language used for writing the source code. The parser reads the tokens generated by the lexical analyzer and compares them to the grammar of the programming language. If the program follows the rules, then it is syntactically correct. If the parser encounters a mistake, it will issue a warning or error message, then will attempt to continue. Some parsers may try to correct such errors. When the parser reaches the end of the token stream, it will either indicate to the compiler that (1) the program is grammatically correct and compiling can continue; or (2) the program contains too many errors and compiling must be aborted.

If the program is grammatically correct, a semantic analysis phase will be implemented. The semantic routines of a compiler ascertain that each series of tokens will be understood by the computer when translated to machine code. In addition, the semantic routines convert the series of tokens into an intermediate code, which is one step closer to machine code. The first task involves analyzing a series of tokens (a "production") and determining whether the production makes sense (whether the variables have been declared, are of the right type, etc.). If the production makes sense, the semantic routine reduces the production for the code generation phase.

The optional first phase of code generation involves optimization and the second phase involves object code generation. In the optimization phase, the compiler attempts to make the intermediate code generated by the semantic routines more efficient. Because this process can be very slow and may not result in much improvement, many compilers do not include optimizers. In the target code generation phase, the intermediate code produced by the optimizer (or semantic routines if there is no optimizer) and generates object code.

When the compiler is finished, the object code produced will be in a format that may be processed by a linker. The linker will produce an executable file from the object code generated by the compiler.

Some implementations use a GCC ("GNU Compiler Collection") compiler. GCC contains front ends for C, C++, Objective-C, Fortran, Java, and Ada, as well as libraries for these languages (libstdc++, libgcj, etc.). "GCC" is both the most general name for the compiler and the name used when the emphasis is on compiling C programs (as the abbreviation formerly stood for "GNU C Compiler").

According to some implementations, the following algorithm is used for processing each pointer:

```
IF < memory address of executable code> THEN
    Storage_size := 32 bits
    Manipulate_as_16bit_quantity := false;
    Manipulate_as_32bit_quantity := true;
ELSE
    Storage_size := 16 bits;
    Manipulate_as_16bit_quantity := true;
    Manipulate_as_32bit_quantity := false;
```

In some embodiments, the compiler detects when a variable is used to store a function pointer or a label value. If the type of a pointer is pointer-to-function rather than pointer-to-data we allocate a larger storage location for it than for pointer-to-data functions. An example of this test is shown in the italicized code below.

```
case POINTER_TYPE:
case REFERENCE_TYPE:
{
    if (TREE_CODE(TREE_TYPE(type)) = =FUNCTION TYPE)
    {
        int nbits = ((TREE_CODE (type) = = REFERENCE-TYPE
            && reference_types_internal)
            ? GET_MODE_BITSIZE (FPmode) :
            FPOINTER_SIZE);
```

```
-continued

TYPE_MODE (type) = FPmode;
        TYPE_SIZE (type) = bitsize_int (nbits);
        TYPE_SIZE_UNIT (type) size_int
        (nbits /BITS_PER_UNIT);
        TREE_UNSIGNED (type) = 1;
        TYPE_PRECISION (type) = nbits;
    }
    else
```

If a pointer points to a function rather than to data, the rest of the italicized code shown above is invoked. If not, another portion of code (described below) is invoked, as indicated by the "else" line above.

The "int nbits" line above determines whether an object for which space is being allocated is referenced (i.e. is stored in memory) or is in fixed storage (i.e. in a register). For some processors, the allocation size could be different (e.g. a processor with a register that only stored 24 bits of data, but required 32-bits of storage space in memory due to alignment and other issues). In other processors, the registers are always big enough to store the allocated memory storage space. For example, a processor may be configured with an addressable program memory having a first bit width (e.g., 24 bits), but when a pointer to something in program memory is in a register or memory it always takes a second bit width of storage (e.g., 32 bits).

In this case, the pointer is a function pointer, so the TYPE_MODE(type) is FPmode. The TYPE_SIZE(type) has a defined bitsize that is allocated to program memory, as described above. The remaining lines specify the size in terms of "units" as opposed to bits. In this case the "unit" is a byte and so the TYPE_SIZE_UNIT is set to the number of bits/number of bits per byte. (A byte is the smallest addressable unit in the processor memory. Typically a byte is an 8-bit quantity.) The remaining lines specify that the address is an unsigned quantity (a natural number) and has precision (range) as appropriate for a binary number composed on nbits.

If a pointer points to data, the following code is invoked:

```
{
    int nbits = ((TREE_CODE (type) = = REFERENCE_TYPE
        && reference_types_internal)
        ? GET_MODE_BITSIZE (DPmode):
        DPOINTER_SIZE);
    TYPE_MODE (type) = nbits = = DPOINTER_SIZE ?
    ptr_mode : DPmode;
    TYPE_SIZE (type) = bitsize_int (nbits);
    TYPE_SIZE_UNIT (type) = size_int
    (nbits / BITS_PER_UNIT);
    TREE_UNSIGNED (type) = 1;
    TYPE_PRECISION (type) = nbits;
```

The above "int nbits" line of code is very similar to the previously-described assignment of nbits. The number of bits allocated in the first case is for pointers to program memory and number of bits allocated in the second case is for pointers to data memory. In one implementation, nbits is 32 in the first case and 16 in the second case. The other lines of code parallel those described above, except that they pertain to a data pointer instead of a function pointer.

Preferred implementations of the invention detect code that takes the address of a function or takes the address of a label. The code below provides one example of a method for detecting these forms of code by their types and allocating them to larger storage locations (indicated by the FPmode code).

```
switch (code)
{
      case LABEL_DECL:
      {
      .....
          temp = gen_rtx_MEM (FUNCTION_MODE,
                  gen_rtx_LABEL_REF
                  (FPmode, label_rtx (exp)));
      .....
      case GOTO_SUBROUTINE_EXPR:
      {
          emit_move_insn (return_link,
              gen_rtx_LABEL_REF (FPmode,
return_address));
```

Figure 3:
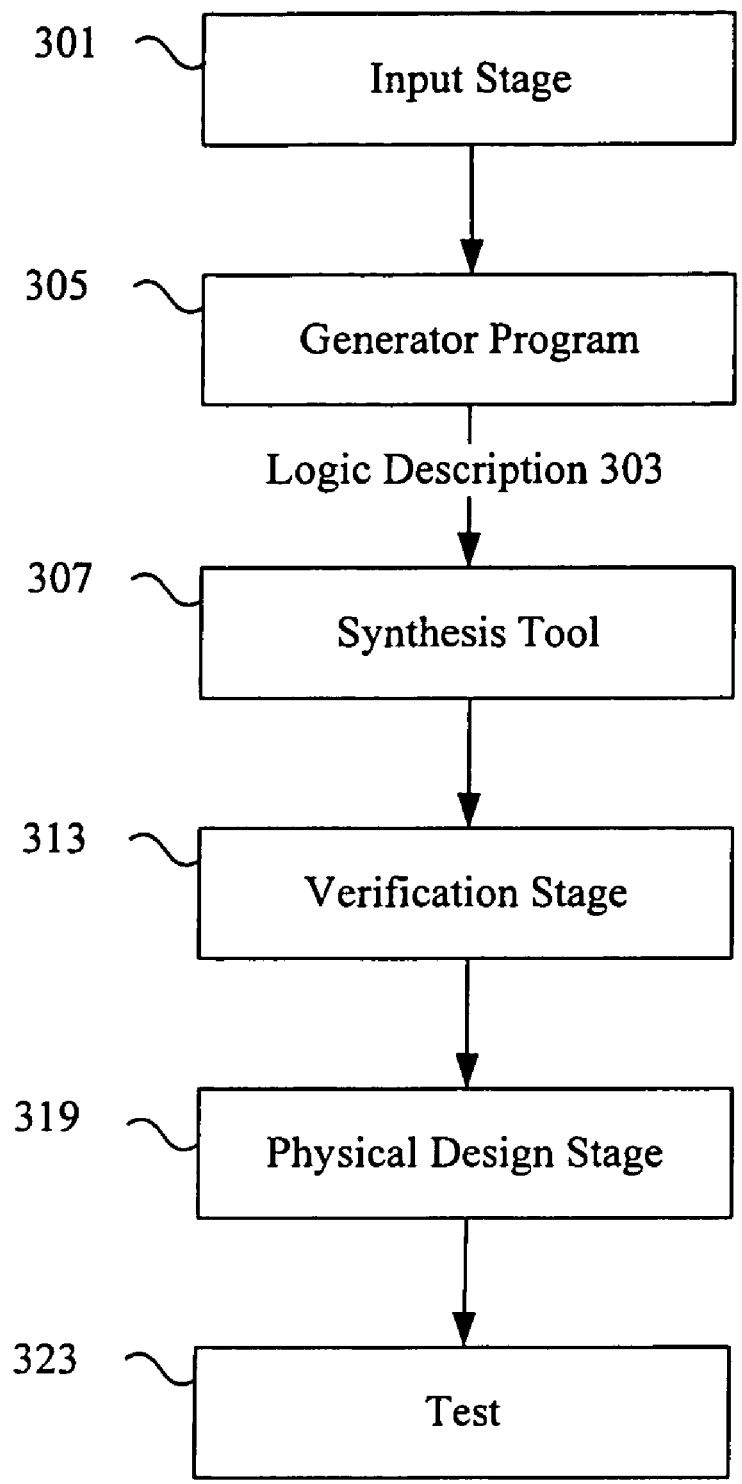
FIG. 3 is a diagrammatic representation showing a technique for implementing a programmable chip.

FIG. 3 is a diagrammatic representation showing the implementation of one example of a programmable chip that can be run using the compiler described above. An input stage 301 receives selection information typically from a user for logic such as a processor core as well as other components to be implemented on an electronic device. A generator program 305 creates a logic description and provides the logic description along with other customized logic to any of a variety of synthesis tools, place and route programs, and logic configuration tools to allow a logic description to be implemented on an electronic device.

In one example, an input stage 301 often allows selection and parameterization of components to be used on an electronic device. Selection of share or no share can be made. In some examples, components provided to an input stage include intellectual property functions, megafunctions, and intellectual property cores. The input stage 301 may be a graphical user interface using wizards for allowing efficient or convenient entry of information. The input stage may also be a text interface or a program reading a data file such as a spreadsheet, database table, or schematic to acquire selection information. The input stage 301 produces an output containing information about the various modules selected.

In typical implementations, the generator program 305 can identify the selections and generate a logic description with information for implementing the various modules. The generator program 305 can be a Perl script creating HDL files such as Verilog, Abel, VHDL, and AHDL files from the module information entered by a user. According to various embodiments, the generator program 305 also provides information to a synthesis tool 307 to allow HDL files to be automatically synthesized. In some examples, a logic description is provided directly by a designer. Some of the available synthesis tools are Leonardo Spectrum, available from Mentor Graphics Corporation of Wilsonville, Oreg. and Synplify available from Synplicity Corporation of Sunnyvale, Calif. The HDL files may contain technology specific code readable only by a synthesis tool. The HDL files at this point may also be passed to a simulation tool.

As will be appreciated by one of skill in the art, the input stage 301, generator program 305, and synthesis tool 307 can be separate programs. The interface between the separate programs can be a database file, a log, or simply messages transmitted between the programs. For example, instead of writing a file to storage, the input stage 301 can send messages directly to the generator program 305 to allow the generator program to create a logic description. Similarly, the generator program can provide information directly to the synthesis tool instead of writing HDL files. Similarly, input stage 301, generator program 305, and synthesis tool 307 can be integrated into a single program.

A user may select various modules and an integrated program can then take the user selections and output a logic description in the form of a synthesized netlist without intermediate files. Any mechanism for depicting the logic to be implemented on an electronic device is referred to herein as a logic description. According to various embodiments, a logic description is an HDL file such as a VHDL, Abel, AHDL, or Verilog file. A logic description may be in various stages of processing between the user selection of components and parameters to the final configuration of the device. According to other embodiments, a logic description is a synthesized netlist such as an Electronic Design Interchange Format Input File (EDF file). An EDF file is one example of a synthesized netlist file that can be output by the synthesis tool 307.

A synthesis tool 307 can take HDL files and output EDF files. Tools for synthesis allow the implementation of the logic design on an electronic device. Some of the available synthesis tools are Leonardo Spectrum, available from Mentor Graphics Corporation of Wilsonville, Oreg. and Synplify available from Synplicity Corporation of Sunnyvale, Calif. Various synthesized netlist formats will be appreciated by one of skill in the art.

A verification stage 313 typically follows the synthesis stage 307. The verification stage checks the accuracy of the design to ensure that an intermediate or final design realizes the expected requirements. A verification stage typically includes simulation tools and timing analysis tools. Tools for simulation allow the application of inputs and the observation of outputs without having to implement a physical device. Simulation tools provide designers with cost effective and efficient mechanisms for both functional and timing verification of a design. Functional verification involves the circuit's logical operation independent of timing considerations. Parameters such as gate delays are disregarded.

Timing verification involves the analysis of the design's operation with timing delays. Setup, hold, and other timing requirements for sequential devices such as flip-flops are confirmed. Some available simulation tools include Synopsys VCS, VSS, and Scirocco, available from Synopsys Corporation of Sunnyvale, Calif. and Cadence NC-Verilog and NC-VHDL available from Cadence Design Systems of San Jose, Calif. After the verification stage 313, the synthesized netlist file can be provided to physical design tools 319 including place and route and configuration tools. A place and route tool typically locates logic cells on specific logic elements of a target hardware device and connects wires between the inputs and outputs of the various logic elements in accordance with logic required to implement an electronic design. The device can also be physically tested at 323.

For programmable logic devices, a programmable logic configuration stage can take the output of the place and route tool to program the logic device with the user selected and parameterized modules. According to various embodiments, the place and route tool and the logic configuration stage are provided in the Quartus Development Tool, available from Altera Corporation of San Jose, Calif. As will be appreciated by one of skill in the art, a variety of synthesis, place and route, and programmable logic configuration tools can be tested using various techniques of the present invention.

As noted above, different stages and programs can be integrated in a variety of manners. According to one embodiment, the input stage 301, the generator program 305, the synthesis tool 307, the verification tools 313, and physical design tools 319 are integrated into a single program. The various stages are automatically run and transparent to a user. The program can receive the user selected modules, generate a logic description depicting logic for implementing the various selected modules, and implement the electronic device. As will be appreciated by one of skill in the art, HDL files and EDF files are mere examples of a logic description. Other file formats as well as internal program representations are other examples of a logic description.

Figure 4:
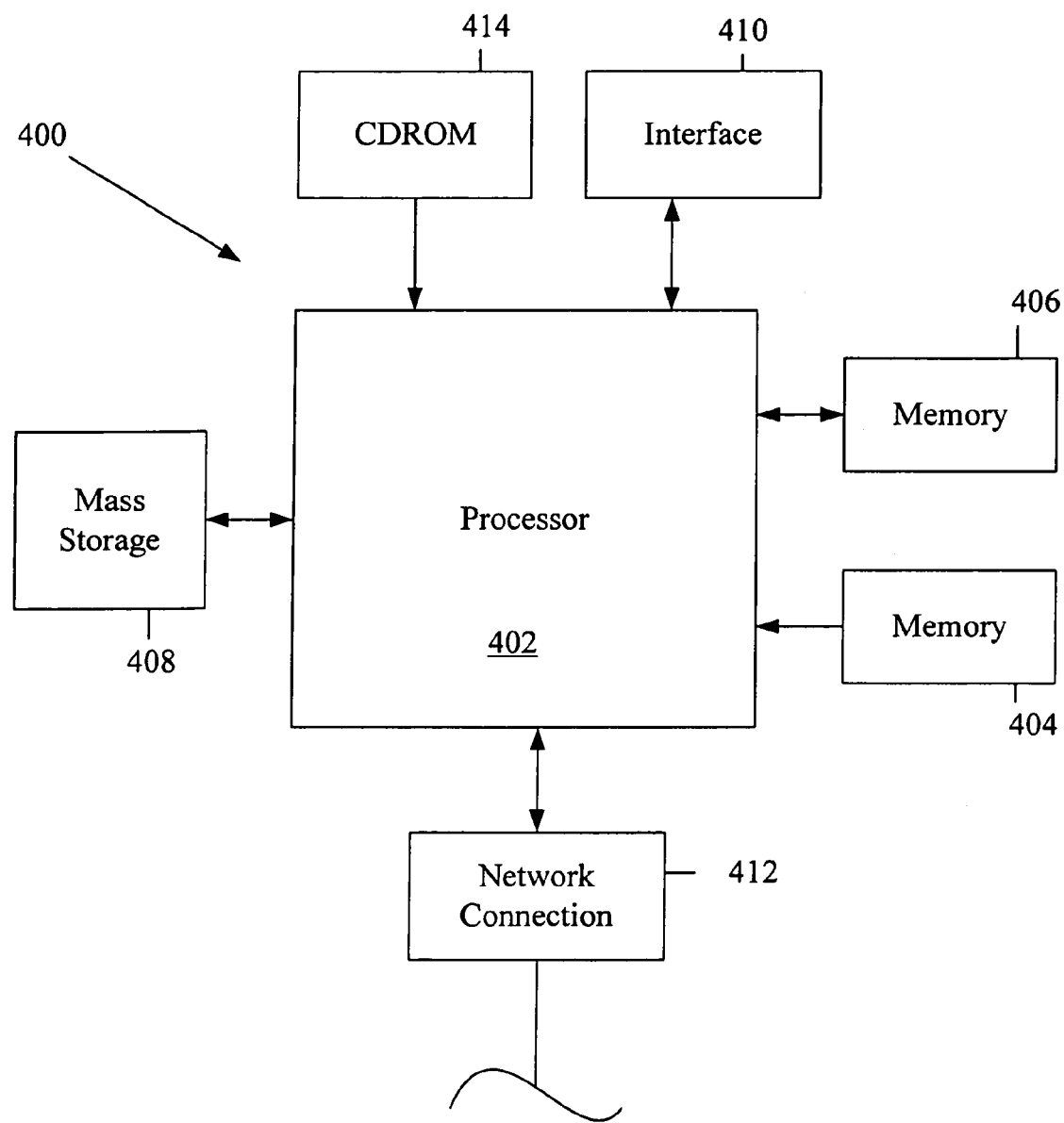
FIG. 4 is a diagrammatic representation of a computer system that can be used to implement the techniques of the present invention.

FIG. 4 illustrates a typical computer system that can be used to implement a programmable chip or to run a compiler. The computer system 400 includes any number of processors 402 (also referred to as central processing units, or CPUs) that are coupled to devices including memory 406 (typically a random access memory, or "RAM"), memory 404 (typically a read only memory, or "ROM"). The processors 402 can be configured to generate a test sequences for any designated processor. As is well known in the art, memory 404 acts to transfer data and instructions uni-directionally to the CPU and memory 406 is used typically to transfer data and instructions in a bi-directional manner.

Both of these memory devices may include any suitable type of the computer-readable media described above. A mass storage device 408 is also coupled bi-directionally to CPU 402 and provides additional data storage capacity and may include any of the computer-readable media described above. The mass storage device 408 may be used to store programs, data and the like and is typically a secondary storage medium such as a hard disk that is slower than memory. The mass storage device 408 can be used to hold a library or database of prepackaged logic or intellectual property functions, as well as information on generating particular configurations. It will be appreciated that the information retained within the mass storage device 408, may, in appropriate cases, be incorporated in standard fashion as part of memory 406 as virtual memory. A specific mass storage device such as a CD-ROM 414 may also pass data uni-directionally to the CPU.

CPU 402 is also coupled to an interface 410 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 402 optionally may be coupled to a computer or telecommunications network using a network connection as shown generally at 412. With such a network connection, it is contemplated that the CPU might receive information from the network, or might output information to the network in the course of performing the above-described method steps. It should be noted that the system 400 may also be associated with devices for transferring completed designs onto a programmable chip. The above-described devices and materials will be familiar to those of skill in the computer hardware and software arts.

The hardware elements described above may be configured (usually temporarily) to act as multiple software modules for performing the operations of this invention. For example, instructions for running a generator program, input stage (e.g., a wizard), and/or compiler may be stored on mass storage device 408 or 414 and executed on CPU 408 in conjunction with primary memory 406.

Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. For example, the embodiments described above may be implemented using firmware, software, or hardware. Moreover, embodiments of the present invention may be employed with a variety of different file formats, languages, and communication protocols and should not be restricted to the ones mentioned above. Therefore, the scope of the invention should be determined with reference to the appended claims.

We claim:

1. A method of accessing memories in a processor, the method comprising:
   determining whether a pointer variable points to a data memory having a first address size or a program memory having a second address size greater than the first address size;
   allocating the first address size to the pointer variable when it is determined that the pointer variable points to the data memory; and
   allocating the second address size to the pointer variable when it is determined that the pointer variable points to the program memory.

2. The method of claim 1, wherein the method is performed when source code is compiled.

3. The method of claim 1, wherein the processor comprises a plurality of registers each having a third address size equal to the first size.

4. The method of claim 1, wherein the method is performed by a compiler.

5. The method of claim 1, wherein the method is performed by preprocessing script.

6. The method of claim 1, wherein the operation of determining comprises:
   detecting whether the pointer variable points to a function or a label value.

7. The method of claim 1, further comprising:
   reading the pointer variable from a source code written in a high level programming language.

8. An apparatus for accessing memories in a processor, the apparatus comprising:
   means for determining whether a pointer variable points to a data memory having a first address size or a program memory having a second address size greater than the first address size;
   means for allocating the first size to the pointer variable when it is determined that the pointer variable points to the data memory; and
   means for allocating the second address size to the pointer variable when it is determined that the pointer variable points to the program memory.

9. The apparatus of claim 7, wherein the processor comprises a plurality of registers each having a third address size equal to the first address size.

10. A computer program stored in a machine-readable medium, the program containing instructions to control a device to perform the following steps:
    determine whether a pointer variable points to a data memory of a processor, the data memory having a first address size or a program memory of the processor, the program memory having a second address size greater than the first address size;

allocate the first address size to the pointer variable when it is determined that the pointer variable points to the data memory; and allocate the second address size to the pointer variable when it is determined that the pointer variable points to the program memory.

11. The computer program of claim 10, wherein the instructions are executed when source code is compiled.

12. The computer program of claim 10, wherein the processor comprises a plurality of registers each having a third address size equal to the first address size.

13. The computer program of claim 10, wherein the instructions are executed by a compiler.

14. The computer program of claim 10, wherein the instructions are executed by preprocessing script.

15. A programmable chip, comprising;

a processor having a plurality of registers;

a data memory accessible by the processor, the data memory having a first bit width;

a program memory accessible by the processor, the program memory having a second bit width, wherein the data memory and the program memory are accessed by pointers allocated by the following process:

determining whether a pointer variable points to a data memory having a first address size or a program memory having a second address size greater than the first address size;

allocating the first address size to the pointer variable when it is determined that the pointer variable points to the data memory; and allocating the second address size to the pointer variable when it is determined that the pointer variable points to the program memory.

16. The programmable chip of claim 15, wherein the plurality of registers each has a third bit width equal to the first bit width.

* * * * *